S. ALLEY.
TIRE TOOL.
APPLICATION FILED MAR. 29, 1909.

949,561.

Patented Feb. 15, 1910.
2 SHEETS—SHEET 1.

Witnesses:—
W. Allen
S. B. Middleton

Inventor
Stephen Alley
per Herbert W. Jenner,
Attorney.

S. ALLEY.
TIRE TOOL.
APPLICATION FILED MAR. 29, 1909.
949,561.
Patented Feb. 15, 1910.
2 SHEETS—SHEET 2.
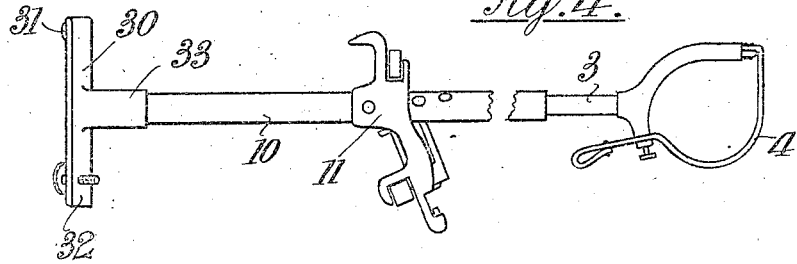
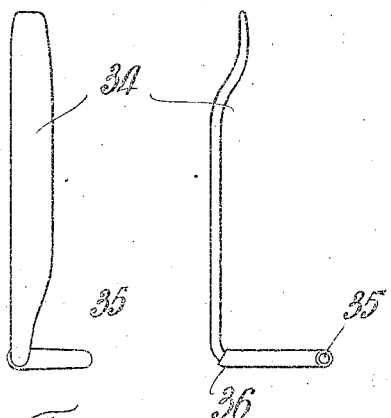
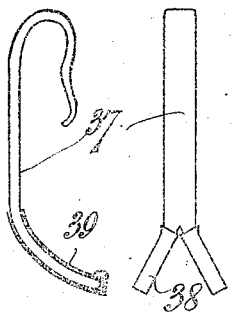
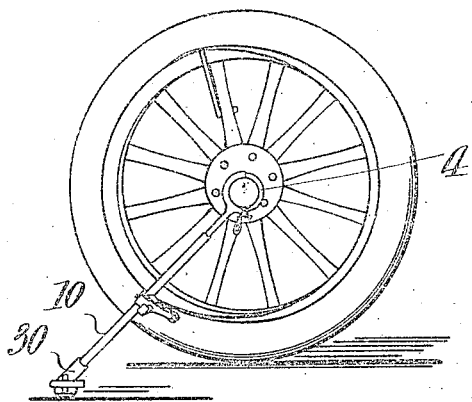
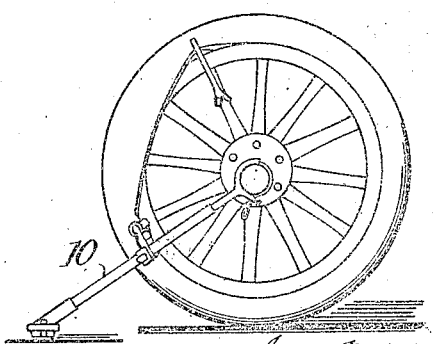
Witnesses:
Inventor
Stephen Alley.
per Herbert W. Jenner.
Attorney.

UNITED STATES PATENT OFFICE.

STEPHEN ALLEY, OF WESTMINSTER, LONDON, ENGLAND.

TIRE-TOOL.

949,561. Specification of Letters Patent. Patented Feb. 15, 1910.

Application filed March 29, 1909. Serial No. 486,551.

*To all whom it may concern:*

Be it known that I, STEPHEN ALLEY, engineer, residing at Broadway Chambers, Westminster, London, S. W., England, have invented certain new and useful Improvements in Tire-Tools; and I do hereby declare the following to be a full, clear, and exact description of the invention, such as will enable others skilled in the art to which it appertains to make and use the same.

This invention consists in devices for removing or replacing pneumatic tires on vehicle wheels and has for its object to construct an apparatus that will enable a tire cover to be removed or replaced in whole or in part from its rim from one side of the wheel and to not only reduce the labor and trouble of this operation but to lessen the liability of damaging the tire beads or nipping the inner tube.

The device, apart from the special tools employed to start the operation of either removal or replacement, consists of two principal parts, one part acting as a fulcrum capable of being placed upon the hub of the wheel and a second part having a tube lever engaging telescopically the fulcrum shank and carrying on its length a cross member fitted with rollers, and at its end a T piece or foot capable of adjustment. By the use of this device as hereinafter described the tire cover rather than being sprung off the wheel by leverage as is customary with many appliances in vogue at the present day, is spun off the rim by means of rollers with an even tension, and with an ease and simplicity hitherto impossible.

In order to describe this invention more particularly reference is made to the accompanying drawings, in which:—

Figure 1:
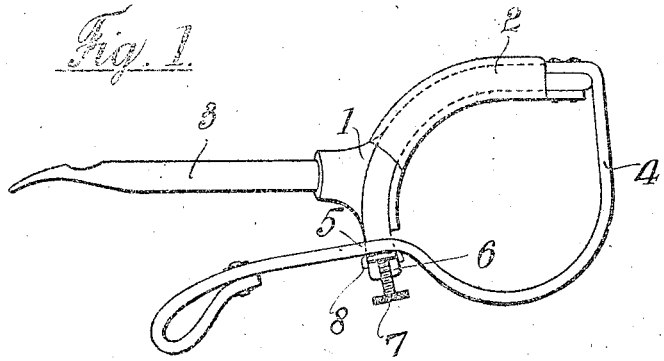
Figure 2:
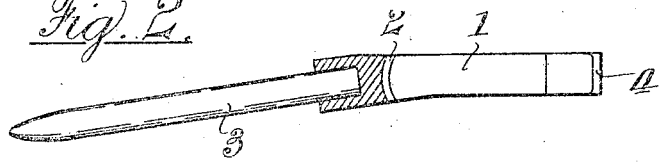
Figure 3:
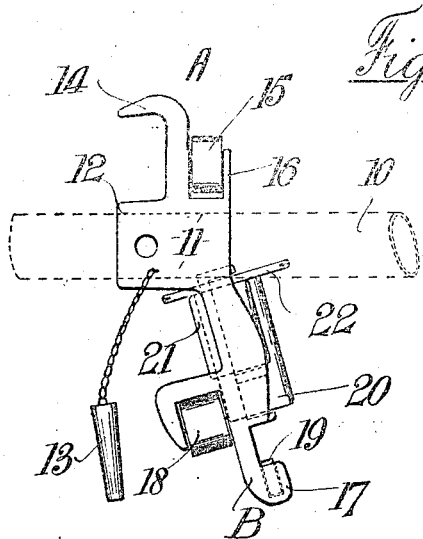
Figure 3:
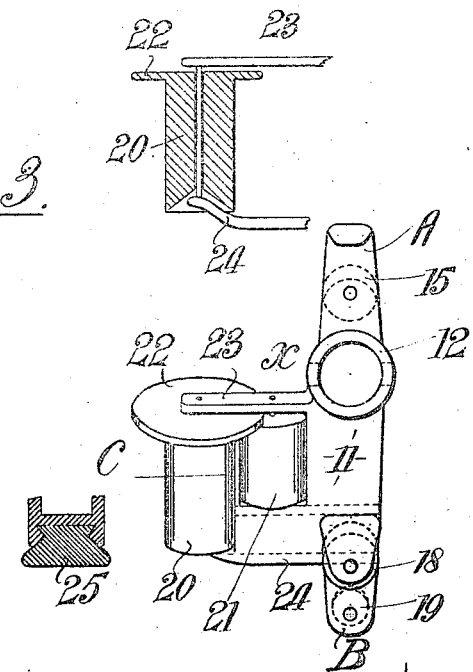

Figure 1. is an elevation of the fulcrum lever. Fig. 2. is a sectional plan of Fig. 1. Fig. 3. shows detail of cross member. Fig. 4. shows the device assembled. Fig. 5. shows the stop or tool used when removing a cover. Fig. 6. shows the replacing stop. Fig. 7. shows diametrically the operation of removing the cover. Fig. 8. shows the operation of replacement.

In the drawings the fulcrum lever Figs. 1 and 2, is formed of a cast shoulder 1, curved in a semi parabolic fashion, so that it will have a fair bearing on any size of wheel hub. It is faced with leather 2, which is sewed around same as shown and is of the section indicated in plan. Cast with or fitted to the shoulder 1, is a lever 3, formed jimmy fashion with a pointed end. The shoulder 1 does not lie in the same plane with the lever 3, but is inclined at an angle as shown so that the tube lever capable of telescopic attachment thereto may be carried clear of the mud guards, which in the case of a motor vehicle frequently overhangs the wheel to a considerable extent. Riveted onto the shoulder 1, is a stop 4, which is passed through a slot 5 on the downward extremity 6 in which it is capable of fixture by means of the set screw 7. A shoe 8 is fitted over the slot to take the set screw pressure so that the strap is not pierced.

After fitting the fulcrum shoulder 1, to the wheel hub a handled tube 10, see Figs. 3, 4, 7, and 8 is fitted over the lever 3. This tube carries a cross member 11, (see Fig. 3). This consists of a metallic casting having three lateral projections from a common boss, bush or sleeve 12 which latter is drilled out to be a sliding fit upon the tube 10. It is attached to the tube by means of a taper pin 13, chained to the casting against loss, and in order to allow for the adjustment of the cross member to a convenient distance from the hub more than one hole is drilled and to obtain a correct angle when the lever foot is upon the ground at differing radial positions upon the tube circumference as shown in Fig. 4. The cross member 11 has three lateral projections A. B. and C. The projection A is employed for the removal of the tire, the projection B for replacing the tire and the part C for putting on a new cover when the bead farthest away from the operator has to be slipped over the rim prior to the second bead being placed within the rim. The projection A consists of a hook 14, on the back of which is a roller 15, pivoted between a check 16 and the hook casting 14, and at right angles to the boss 12. The hook is adapted to engage with the tire bead. The projection B has a similar hook 17, and a roller 18 on the back, a small roller 19 being fitted within the hook, which is designed to engage the wheel rim. The projection C (see Fig. 3) carries a pair of larger rollers 20 and 21 the outer of which 20 has a flange 22. Both are mounted between checks 23 and 24. The check 24 is bent inward and recessed into the metal of the roller to prevent abrasion of the bead. These checks may be of plain metal or may be recessed and provided with leather, rubber, or other pads 25 as shown in section, to prevent the paint or varnish on the wheel from abrasion when the device is in use. This projection is used to replace a new tire upon the vehicle wheel rim.

The foot or handle 30, shown in Fig. 4, consists of a casting made T piece fashion and provided with a heel 31 and adjustment screw at toe 32. It has a boss 33 drilled to receive the tube 10.

The removing stop 34, see Fig. 5, consists of a piece of flat iron bent as shown and terminating in a round leg 35, covered with a rubber sheath 36.

The replacing stop 37 consists of a similar metal tool but split and shaped as shown. The legs 38 are provided with molded rubber sheaths 39 or tube.

The operation of this invention is as follows:—To remove a cover as see Fig. 7, the fulcrum lever shoulder 1 is fitted to the hub of the wheel, which latter is preferably jacked up as usual to allow of the succeeding operations taking place. Having adjusted the strap 4 to the diameter of the projecting hub, the removal stop 35, (see Fig. 5) is inserted between the tire bead and the rim and its hooked end placed under a wheel spoke as shown in Fig. 7. In the event of the tire bead having rusted into the rim or the former being difficult of removal the end of the fulcrum lever 3 may be used to effect an entrance for the stop. The next step is to place the tube over the fulcrum lever 3 fitted to the hub and to engage the hook on the cross member beneath the raised tire cover, so that the roller or leather shoe engages the side of the rim. If the wheel is lifted clear of the ground the entire lever is now rotated with the wheel until the foot is on the ground, and the screw-head 32 adjusted until a good ground bearing is obtained. By the operator now standing behind the lever and giving the vehicle wheel a rotary motion by pulling on the spokes toward him the tire cover is spun off.

To completely detach a tire cover from the wheel rim a similar operation is performed with the farther tire bead, after removal of the inner tube. In this case the farther bead is drawn to the near side and rolled off.

In the event of the wheel not being free from the ground the lever handle or foot 30 is grasped by the operator and pulled around against the inertia of the car, which if insufficient to prevent movement the wheel may be locked with a skid.

It is usually only necessary to detach rather more than half the cover the remaining portion easily coming away. To replace the tire now completely removed one segmental portion of the cover bead is placed on the rim. The fulcrum lever 3 is slipped on the hub with the lever pointing in an upward direction. The tube 10 carrying the cross member 11 is then slipped on to the fulcrum lever, the replacement hook 17 is slipped over the edge of the rim with its steel roller 19 on cross member engaging the side of the rim, the cover is then slipped over the tool foot and a segmental portion of the bead farthest from the operator placed over the rim, the bead nearest the operator is placed nearest the gap x (see Fig. 3,) the forked stop 37 is placed between the bead of the tire with the lip of the hook engaging the side of the rim, the fork end of the lever is placed over one of the spokes preventing the tire from coming off the wheel at this particular part, the foot of the lever is then gripped with the right hand, the left hand being placed on the tire pressing same down on the rim, the handle or foot is then moved away from the operator circumferentially, as far as said operator can reach, when a fresh hold is taken with the left hand and this operation repeated until about half of the tire is seated upon the rim when the lever and wheel is rotated until the lever rests upon the ground, by now rotating the wheel by pulling the spokes toward the lever the remainder of this bead upon the cover is spun into place. The inner tube is then inserted and the nearer tire cover bead rolled on in a similar manner.

It will be noted that the replacement portion of the cross member is inclined, which is tantamount to coning the roller and effects the operation of replacement as a sliding cone.

I claim.

1. In a tire-setter, the combination, with a lever provided at one end with a fulcrum-piece for engaging with the wheel-hub, and having at its other end a foot for bearing against the ground; of a crosspiece secured on the middle part of the said lever and provided with three lateral projections having rollers, two of the said projections being arranged at opposite sides of the crosspiece and having hooks for removing and replacing the tire respectively, and the third projection being adapted for placing a new tire on the wheel and being provided with a pair of rollers journaled parallel to each other, one of the said rollers being provided with a flange at one end which overlaps the other roller.

2. In a tire-setter, the combination, with a fulcrum-piece for engaging with a wheel-hub, and a lever arranged at an angle to the said fulcrum-piece and secured to it at one end, of a tube slidable over the said lever and provided at its free end with a foot for engaging with the ground, and an adjustable crosspiece secured on the middle part of the said tube and provided with three lateral projections having rollers, two of the said projections being arranged at opposite sides of the crosspiece and having hooks for removing and for replacing the tire respectively, and the third projection being adapted for placing a new tire on the wheel and being provided with a pair of rollers journaled parallel to each other, one of the said rollers being provided with a flange at one end which overlaps the other roller.

In testimony whereof I affix my signature, in presence of two witnesses.

STEPHEN ALLEY.

Witnesses:
F. H. ROGERS,
H. D. JAMESON.